US006985254B2

(12) United States Patent
Allen et al.

(10) Patent No.: US 6,985,254 B2
(45) Date of Patent: Jan. 10, 2006

(54) CALIBRATION OF A MULTI COLOR IMAGING SYSTEM USING A PREDICTED COLOR SHIFT

(75) Inventors: William J Allen, Corvallis, OR (US); Paul A Richards, Corvallis, OR (US); George C Ross, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 950 days.

(21) Appl. No.: 09/846,104

(22) Filed: Apr. 30, 2001

(65) Prior Publication Data

US 2002/0180996 A1 Dec. 5, 2002

(51) Int. Cl.
H04N 1/48 (2006.01)
H04N 1/60 (2006.01)
H04N 1/50 (2006.01)

(52) U.S. Cl. .................. 358/1.9; 358/504; 358/518
(58) Field of Classification Search ............... 358/300, 358/504, 518, 519, 520, 1.9; 355/88; 347/19; 106/31.65
See application file for complete search history.

(56) References Cited

U.S. PATENT DOCUMENTS

| 5,294,959 A * | 3/1994 | Nagao et al. ............. 399/44 |
| 5,387,976 A | 2/1995 | Lesniak |
| 5,508,826 A | 4/1996 | Lloyd et al. |
| 5,612,902 A | 3/1997 | Stokes |
| 5,731,823 A | 3/1998 | Miller et al. |
| 5,760,913 A | 6/1998 | Falk |
| 5,818,960 A | 10/1998 | Gregory, Jr. et al. |
| 5,828,781 A | 10/1998 | Nakano |
| 5,877,787 A | 3/1999 | Edge |
| 6,027,201 A | 2/2000 | Edge |
| 6,030,066 A | 2/2000 | Li et al. |
| 6,033,137 A * | 3/2000 | Ito .......................... 400/74 |
| 6,038,374 A | 3/2000 | Jacob et al. |
| 6,062,137 A | 5/2000 | Guo et al. |
| 6,076,915 A | 6/2000 | Gast et al. |
| 6,081,353 A | 6/2000 | Tanaka et al. |
| 6,128,022 A | 10/2000 | Dillinger |
| 6,157,469 A | 12/2000 | Mestha |
| 6,160,968 A | 12/2000 | Noda |
| 6,164,750 A | 12/2000 | Subirada et al. |
| 6,172,690 B1 | 1/2001 | Angulo et al. |
| 6,178,007 B1 | 1/2001 | Harrington |
| 6,185,004 B1 | 2/2001 | Lin et al. |
| 6,297,873 B1 * | 10/2001 | Furuya ..................... 355/40 |
| 6,610,133 B2 * | 8/2003 | Campbell ............... 106/31.86 |
| 6,744,531 B1 * | 6/2004 | Mestha et al. ............ 358/1.9 |

* cited by examiner

*Primary Examiner*—Kimberly Williams
*Assistant Examiner*—Charlotte M. Baker

(57) ABSTRACT

A method for predicting the settled appearance of a test patch printed by an imaging system by applying a transfer function to the color of a freshly printed test patch. The transfer function may be formulated to take into account a variety of environmental conditions, such as humidity or temperature, or post-printing processes, such as lamination. The predicted settled test patch color may be exported to an external image processor, or the imaging system processor may internally compare the predicted settled test patch color with the desired test patch color in order to calibrate the color map used by the imaging system.

22 Claims, 4 Drawing Sheets

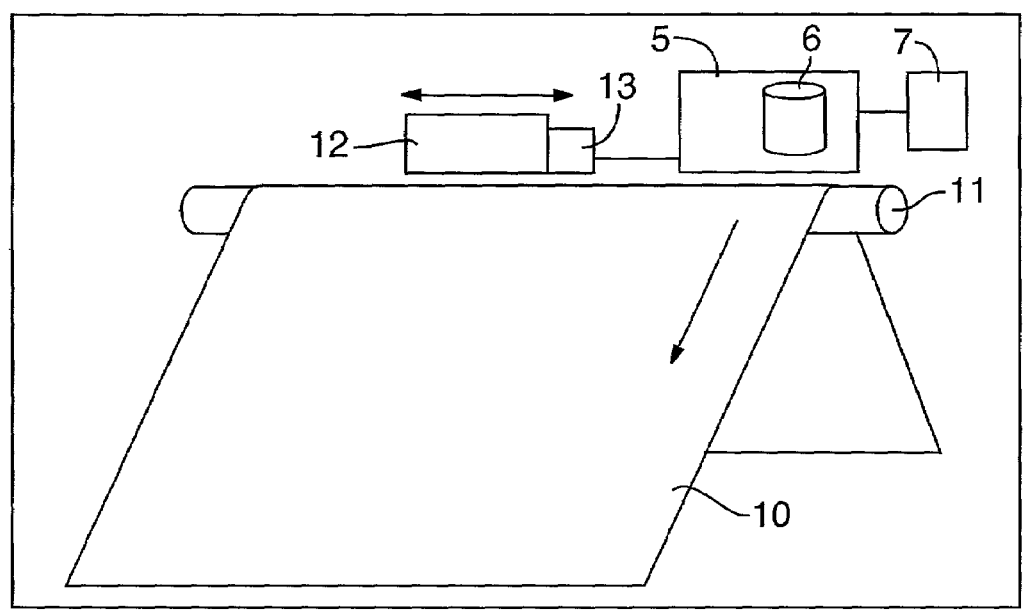
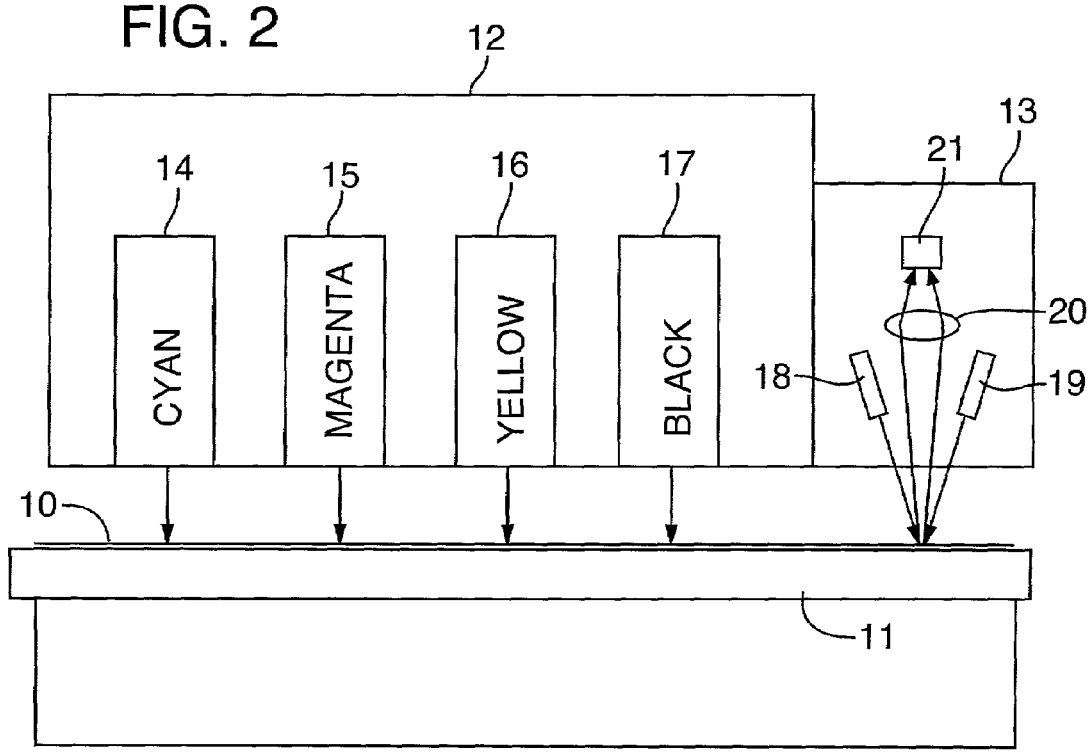

CALIBRATION OF A MULTI COLOR IMAGING SYSTEM USING A PREDICTED COLOR SHIFT

FIELD OF THE INVENTION

The invention relates to the calibration of multi-color imaging systems for the accurate production of desired colors in the imaging system output. The calibration method is useful for the color calibration of inkjet printers, electrophotographic printers, and offset printers.

BACKGROUND OF THE INVENTION

Multi-color imaging systems, such as color printers and color copiers, are widely available, and offer various combinations of performance and affordability for almost any application. Technological advancements in ink formulation, print medium development, and printer drivers allow the production of sophisticated color documents.

The generation of a printed color document typically begins with a description of the desired image in color space. This description may be generated by a scanner, or it may be generated on a computer using color image creation software. The colors present in an image defined by a workstation or a personal computer typically exist in a device-independent color space. A commonly utilized color space is CIELAB space.

CIELAB space, or more properly, 1976 CIE L*a*b* space, is a tristimulus color space with the coordinates L*, a*, and b*. The central vertical axis (L*) represents lightness, with values from 0 (black) to 100 (white). The two color axes each run from positive to negative. On the a–a' axis (a*), positive values indicate amounts of red while negative values indicate amounts of green. On the b–b' axis (b*), yellow is positive, and blue is negative. For both the a–a' axis and the b–b' axis, zero is neutral gray. A single specific color can be uniquely identified with a value for each color axis, and a value for the lightness or grayscale axis. CIE L*a*b* space is device-independent.

In order for an imaging system to print the desired image, the device-independent coordinates must first be mapped to a device-dependent space that is particular to the imaging system used. For many imaging systems, the device-dependent color space is CMYK space (for Cyan, Magenta, Yellow, and black colorants). A given imaging system uses a color map to transform a selected point in device-independent color space to a particular point in CMYK space. This transformed color corresponds to the amount of cyan, magenta, yellow, and black colorant required in device-dependent color space to generate the color defined in device-independent color space.

The color map conversion of device-independent color to device-dependent color typically takes into account certain physical constraints of the imaging system (for example ink drop size, ink density, ink behavior on the printing substrate), and typically applies a linearization function to each color channel. There may also be mathematical procedures built into the color map to maximize imaging efficiency and to enhance image quality, such as dithering and half-pixel interpolation. These aspects of color mapping and multi-color imaging have been described in detail previously, and will not be discussed further here.

Unfortunately, a variety of factors can impact the quality of the final image. By final image is meant the appearance of the image, including color, that is stable with respect to time. Variations in colorant density, colorant composition, colorant delivery rate, and media composition can result in wide differences in the appearance of an image after printing. For example, several post-printing modifications of the printed output, such as applying a protective sealant or laminating the output, typically also affect the color of the final image. A printed image can also "settle", or change color, after printing. This color shift is in part due to the mobility of dye molecules on and within the print medium as the freshly applied colorant ages. Inkjet dyes, in particular, are typically applied as aqueous solutions. Until such ink is completely dry, the migration of dye molecules on or in the print medium can continue to alter the appearance of the image. Differential migration and diffusion of individual color components in a multi-color image can also lead to a blurring of details, darkening of the image, or color shift in the image as a whole.

As the nature and extent of dye mobility is to a large extent controlled by the rate of drying of the ink, it should be appreciated that ambient humidity levels have a strong effect on color shift. Likewise, ambient temperature can have a significant effect on the degree and magnitude of color shift observed. In general, higher humidity levels and higher temperatures result in more rapid and more substantial deviations from original color levels.

Table 1 provides an example of the type and magnitude of color shift that can be observed in a printed image using standard inks. Eight series, each having ten test patches, were printed in the colors blue, compK (composite black made from cyan, magenta, and yellow), cyan, green, magenta, red, skin tone, and yellow. The test patches were printed using an inkjet printer and optically scanned to determine their initial color characteristics. The test patches were then placed in a test chamber kept at 35° C. and 80% relative humidity for 4 days. After incubation, the test patches were again optically scanned.

Changes in test patch appearance were measured in units of ΔE (Delta E) according to the following formula:

$$\Delta E = \sqrt{(\Delta L^*)^2 + (\Delta a^*)^2 + (\Delta b^*)^2}$$

where $\Delta L^* = L^*_1 - L^*_2$, $\Delta a^* = a^*_1 - a^*_2$, and $\Delta b^* = b^*_1 - b^*_2$. In general, a ΔE value of 1 is a just perceptible difference and a ΔE value greater than 1 is generally readily distinguished. For comparison purposes, a change of 100 Delta E units represents the difference between a perfectly black patch and a perfectly white patch.

As shown in Table 1, many of the test patches exhibited a color shift of as much as 10 Delta E units, some as high as 16 Delta E units. This represents a substantial change in the appearance of the printed output after settling under the stated environmental conditions (35° C. and 80% relative humidity for 4 days).

TABLE 1

Color shifts after four days at 35° C. and 85% relative humidity

Color Shift (ΔE)

| Patch No. | 1 | 2 | 3 | 4 | 5 | 6 | 7 | 8 | 9 | 10 |
|---|---|---|---|---|---|---|---|---|---|---|
| Blue | 7.2 | 11.2 | 13.2 | 14.7 | 17.9 | 17.0 | 14.2 | 12.3 | 11.6 | 17.1 |
| CompK | 4.6 | 7.3 | 8.8 | 8.2 | 8.3 | 6.7 | 6.6 | 6.9 | 7.7 | 11.0 |
| Cyan | 1.7 | 1.6 | 1.4 | 1.6 | 3.1 | 3.5 | 3.6 | 3.7 | 3.7 | 4.7 |
| Green | 6.8 | 9.2 | 10.6 | 12.2 | 12.2 | 10.7 | 9.3 | 8.0 | 7.2 | 10.5 |
| Magenta | 10.6 | 13.1 | 13.4 | 15.0 | 15.9 | 16.1 | 14.5 | 12.5 | 11.0 | 4.7 |
| Red | 7.7 | 10.8 | 13.6 | 15.6 | 14.5 | 12.1 | 9.1 | 6.8 | 5.8 | 11.0 |
| Skin | 9.3 | 8.8 | 8.5 | 6.6 | — | — | — | — | — | — |
| Yellow | 7.0 | 7.5 | 7.2 | 7.5 | 7.8 | 7.9 | 7.5 | 7.2 | 6.3 | 3.5 |

Current imaging system calibration methods compensate for settling in only a limited fashion, and only under nominal temperature and humidity levels. Deviations from these ideal conditions typically result in imperfect correction, and subsequent color drift in the final image. There is also no rapid and convenient way to allow for changes to the appearance of a printed image due to variations in print medium, lamination, or other image-altering process. What is needed is a method of correcting color output in an imaging system that actively compensates for a variety of post-printing changes to the image color.

SUMMARY OF THE INVENTION

The present invention provides a method of calibrating an imaging system, involving printing a test patch, scanning the test patch, determining a condition that will affect the appearance of the test patch, predicting the appearance of the test patch after settling under the determined appearance-affecting condition, comparing the predicted settled test patch appearance with a desired settled test patch appearance, and calibrating the imaging system to take into account predicted settling of the output under the determined appearance-affecting condition.

The step of predicting the appearance of the test patch after settling under the determined condition may employ a database of experimentally-determined color shift data. Accordingly, another aspect of the invention may include determination of color shift data under one or more appearance-affecting conditions for use in subsequent predictions of color shift. The invention is useful in a multi-color imaging system and thus may use the measured color shift data to predict color shifting of one or more colors under one or more specified appearance-affecting conditions.

BRIEF DESCRIPTION OF THE DRAWINGS

FIG. 1 is a schematic showing the relationship of paper, platen, printer carriage, optical scanner, processor, data storage device, and environmental sensor in an imaging system of the invention.

FIG. 2 is a schematic showing details of the printer carriage and optical scanner in relationship to the paper.

DETAILED DESCRIPTION OF THE INVENTION

Figure 3:
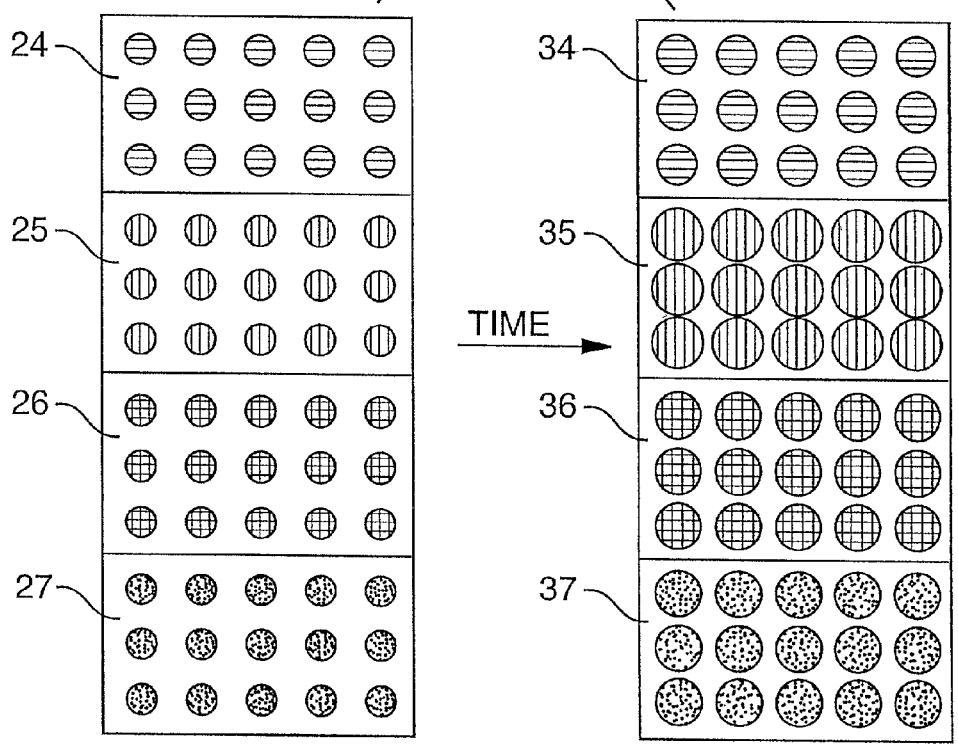
FIG. 3 is a representation of color test patches before and after settling to demonstrate how some colorants undergo additional migration and change in appearance with time after printing.

FIG. 1 shows a simplified diagram of a color imaging system useful for practicing the method of the invention. As indicated, print medium 10 is supported on a roller or platen 11 beneath a reciprocating pen carriage 12. The print medium is passed over the platen, and the pen carriage is moved side-to-side to accommodate the deposit of ink on the print medium via the onboard pens. An optical scanner 13 may be incorporated into the pen carriage. Although it is not required for the purposes of the invention, combining the pen carriage and optical scanner permits them to share mechanical mountings (motion control) and flexible cabling connections and utilize a single pen carriage drive circuit board. The imaging system typically also incorporates a processor 5 that controls the pen carriage and optical scanner, receives measurements from an environmental sensor 7, and directs the calibration process utilizing a database of transfer function stored on a data storage device 6.

Details of the pen carriage and optical scanner are shown in FIG. 2. Pen carriage 12 incorporates pens 14–17, each pen typically being capable of depositing ink of a different color (e.g. cyan, magenta, yellow and black). As the pen carriage 12 travels relative to the medium 10, selected pens 14, 15, 16, and 17 are activated and ink is applied to the medium 10. Ink is typically applied in response to input color values provided to the print engine by an imaging system processor. The colors from the four color pens or printheads are mixed to obtain any other particular color. During calibration, test patches or sample lines are typically printed on the medium 10 to allow the optical scanner 13 to pass over and scan the test patches as part of the calibration process.

The optical scanner of FIG. 2 generally incorporates a light detector 21, and at least one light source 18, 19. Typically the light detector 21 is a photocell, and the light sources 18 and 19 are blue and yellow LEDs, respectively.

Because of the spectral reflectance of the colored inks, the blue LED 18 is used to detect the presence of yellow ink on the medium 10, whereas the yellow LED 19 is used to detect the presence of cyan and magenta ink, with either diode being used to detect black ink. The optical scanner optionally incorporates focusing optics 20, typically one or more lenses, to improve the accuracy of the detected scanned image. In an additional aspect of the invention, the optical scanner is external to the imaging system.

Figure 4:
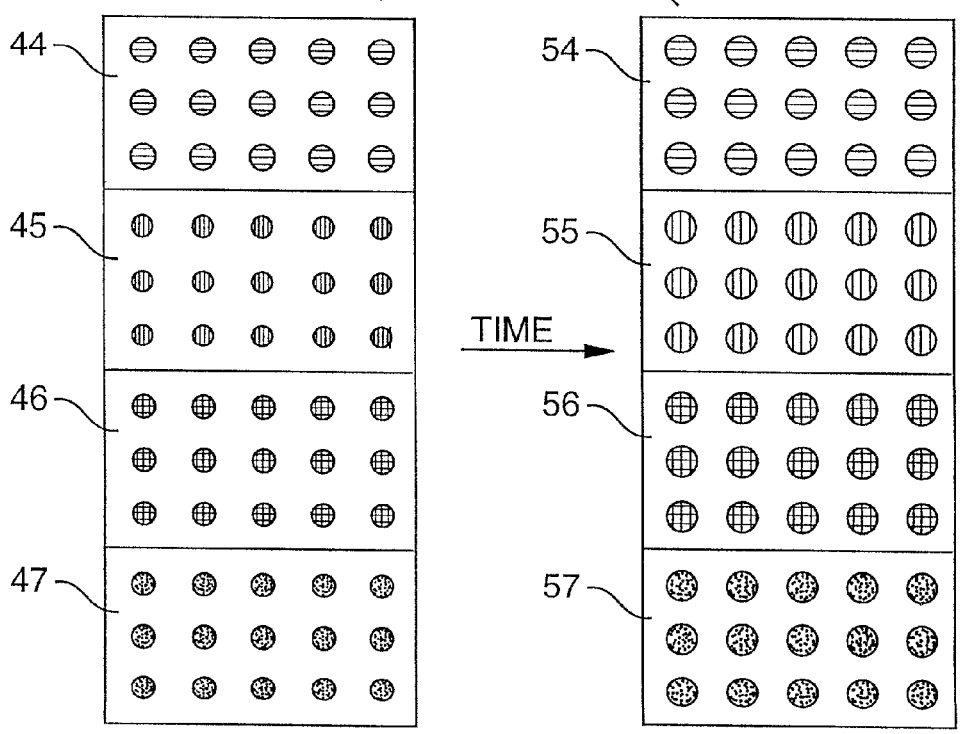
FIG. 4 is a representation of calibrated color test patches before and after settling to demonstrate how the calibration process takes into account predicted dye migration and change in appearance.

FIGS. 3 and 4 are schematic representations of color shifting due to the change in size or shape of individual spots of ink applied by pens 14–17 in a printed test patch. FIG. 3 shows nominal initial test patterns 24–27 composed of individual spots of cyan ink (test pattern 24), magenta ink (test pattern 25), yellow ink (test pattern 26), and black ink (test pattern 27). Test patterns 24–27 represent the desired test pattern appearance. Nominal final test patterns 34–37 represent the appearance of test patterns 24–27 after settling, where the different rates of migration and diffusion of different inks in the print medium result in spots of different colors of ink to vary in size, resulting in a change in perceived color for nominal final test patterns 34–37 relative to nominal initial test patterns 24–27. The size and distribution of ink spots are exaggerated for the purposes of illustration, as is the magnitude and uniformity of the ink migration shown.

Application of a correction factor to the printer output is shown in FIG. 4. After correction of the color map used by the imaging system, subsequent application of proportionally fewer and/or smaller spots of ink result in corrected initial test patterns 44–47. After settling, migration and diffusion of the ink spots in test patterns 44–47 result in corrected final test patterns 54–57 that display an appearance close to the desired appearance (also represented by nominal initial test patterns 24–27). The correction factor applied to the printer output results in compensation for the subsequent ink migration and production of the desired output. The depiction of particular inks exhibiting greater or lesser degrees of migration is for the purposes of illustration. Actual migration properties are due to a combination of factors, including the particular ink components, media composition, and ambient environmental conditions.

Figure 5:
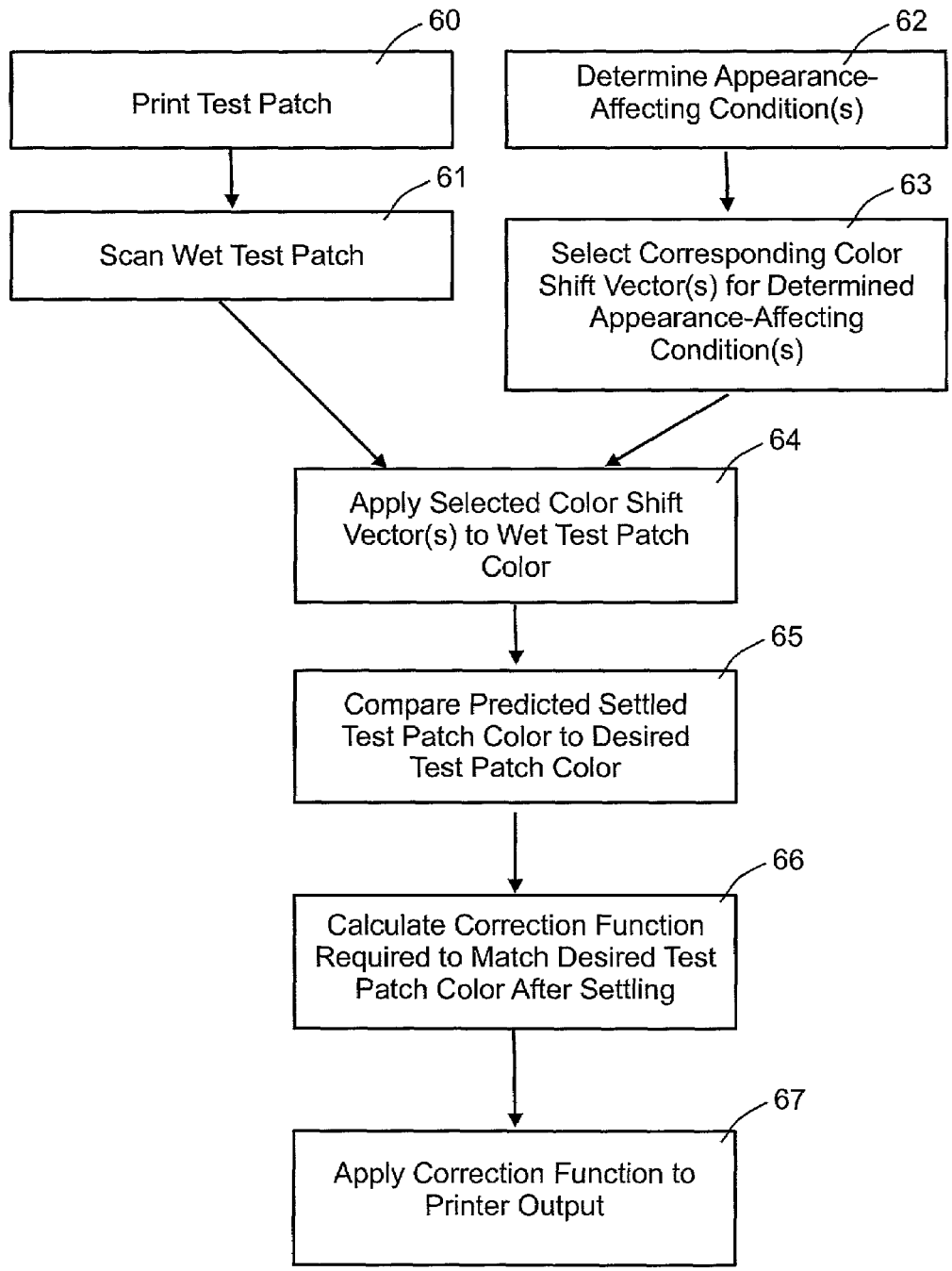
FIG. 5 is a flowchart of the color calibration process in accordance with the present invention.
Figure 6:
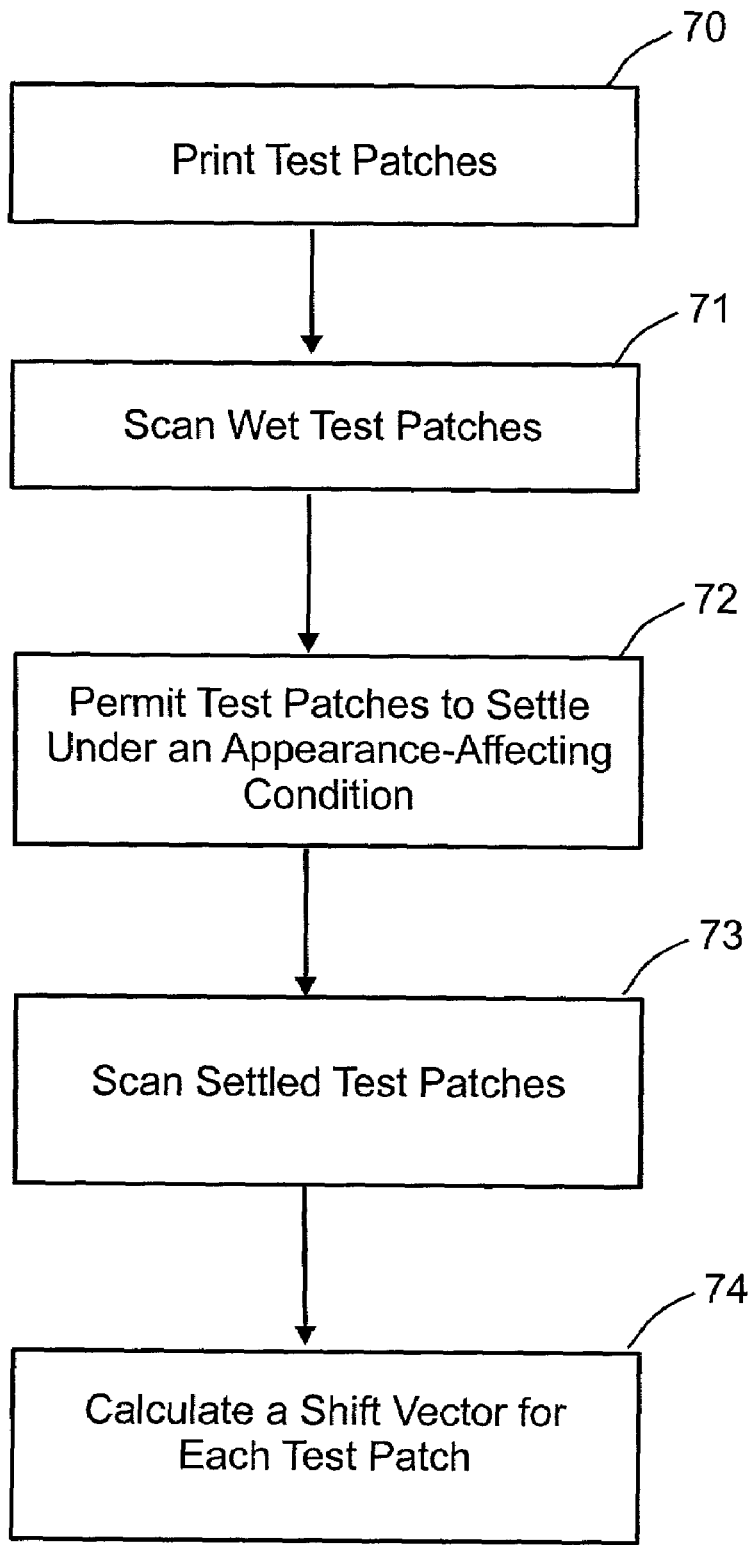
FIG. 6 is a flowchart of the shift vector calculation process in accordance with the present invention.

FIG. 5 is a flow diagram illustrating the color calibration method of the present invention. The processor 5 in the imaging system to be calibrated initiates the calibration process in response to a user calibration request, an elapsed period of time from the last calibration, or a detected change in an environmental condition or other appearance-affecting condition. The processor then directs the imaging system to print at least one test patch, as indicated by block 60. Where a plurality of test patches are printed, they may be printed using a single color ink at various color densities, or multiple test patches may be printed using multiple colors of ink. The wet test patch or patches are then optically scanned to determine an initial or wet test patch appearance, as indicated by block 61. The wet test patches may be optically scanned using an internal or external optical scanner. Any optical scanner that can measure a desired aspect of the color of the test patch (brightness, hue, etc.) is an acceptable optical scanner. Typically, the optical scanner is a spectrometer or a densitometer that is incorporated in the imaging system, but the optical scanner may be external to the imaging system without departing from the scope of the invention.

As used herein, a "wet" test patch is a freshly printed test patch that is characterized by an initial test patch appearance. A wet test patch has not yet undergone aging or maturing, and does not yet exhibit a color shift due to an appearance-affecting condition. Wet test patches include test patches printed by a variety of methods, including inkjet printers, offset printers, and xerographic printers, even where such fresh images are not literally wet in the conventional sense.

Either simultaneously or sequentially, the processor determines one or more appearance affecting conditions that will affect the imaging system output, as indicated in block 62. An appearance-affecting condition is any condition that induces a measurable color shift in a printed image. The appearance-affecting condition thus may be a physical process, such as the application of a protective coating, either by spray application or lamination. Alternatively, the appearance-affecting condition may be an environmental condition, such as ambient humidity, ambient temperature, ambient light intensity, ambient light wavelength, ambient air movement, or any other condition that substantively affects the type or magnitude of color shift of a printed image.

Where the appearance-affecting condition is a choice of print medium, or a post-printing process such as application of a sealant or laminate, the appearance-affecting condition is optionally input by the user of the imaging system, either directly at the printer, or incorporated in the print data sent to the imaging system from a workstation or computer. Alternatively, a sensor incorporated in the imaging system detects the characteristics of the print medium for calculation of the transfer function. Types of print media that exhibit differential print characteristics include plain paper, coated paper, glossy paper, or transparencies, among others. Where the appearance-affecting condition is a physical process, such as the application of a protective sealant or laminate, the time required for settling may be only as long as is required to carry out the physical process.

Where the transfer function is dependent upon an environmental condition, the method of the invention utilizes an environmental sensor 7 that is either external to the imaging system, or incorporated in the imaging system. The environmental sensor is configured to detect and/or measure at least one environmental condition. Any environmental condition that has a detectable effect on the color shift of an output image of the printer is an appropriate environmental condition for the instant method.

Where the environmental condition to be determined is ambient temperature, any sensor that permits the measurement of ambient temperature is an acceptable environmental sensor, including without limitation, thermocouples, resistance temperature devices (RTDs), thermistors, or infrared thermometers. The choice of thermometer used depends on expected maximum and minimum temperatures, the accuracy desired, and compatibility with the printer of the invention. Similarly, any sensor that permits measurement of relative humidity, such as a humidistat or hygrometer is also an acceptable environmental sensor.

As indicated in block 63 of FIG. 5, the printer processor selects a color shift vector that is a function of the determined appearance-affecting condition. This color shift vector is typically selected from a database of transfer functions on a data storage device 6 that is incorporated in the printer of the invention, and linked to the processor. The transfer functions are used by the imaging system processor to predict the settled color of a test patch as a function of its initial wet appearance and the determination of one or more appearance-affecting conditions. The transfer functions optionally depend on the initial appearance of a single primary color, and can utilize as an input value the test patch optical density, the measured CIE L* values for the test patch (for cyan, magenta, and black inks), the measured CIE b* values for the test patch (for yellow ink), or the full CIE L*a*b* value. Alternatively, the input value is a definition of the test patch appearance in another color space, for example CMYK space.

The transfer function database is initially prepared in the laboratory by printing a plurality of test patches containing varying amounts of all the primary inks, optically scanning while wet, permitting the test patches to settle under distinct and known appearance-effecting conditions, then optically scanning the test patches again. For example, test patches may be permitted to settle under varying levels of humidity, or varying temperatures, in order to determine the effect of that environmental condition on the test patches.

Transfer functions are calculated using as inputs the amounts of different primary inks used for each patch, or alternatively, the CIE L*a*b* color coordinates of each patch, and the appropriate appearance-affecting condition. The output of a given transfer function is a color shift vector in a color space, such as CIE L*a*b* color space, or CMYK color space, that relates a given wet test patch color to a corresponding settled test patch color as a function of the appearance-affecting condition(s). Additional factors may also be incorporated into the transfer function, such as additional appearance-affecting conditions, or the identification of a particular media type with distinct settling characteristics. Although a given transfer function can be as simple as a linear regression, as additional input factors are incorporated in the transfer function it is more typically expressed as a polynomial function. Preferred transfer functions are dependent on relative humidity, or ambient temperature, or both. Once the transfer functions are compiled, they are recorded on the data storage device of the printer for use during the calibration process.

A "settled" test patch is a test patch that has aged or matured for a time sufficient for a color shift of the test patch due to one or more appearance-affecting conditions to be effectively or substantially complete. The amount of time required to achieve a settled test patch appearance can be variable. Some color shift may occur in as little as five minutes, but typically a longer period of aging is required for a useful measurement. Typically, at least 15 minutes is required before the measurement of a settled appearance is made. Preferably, however, at least one hour is required. The test patches may be permitted to settle for more than 24 hours, 48 hours, or 96 hours.

After the wet test patch has been scanned to measure the initial color of the test patch, and the relevant appearance-affecting conditions have been determined, the imaging system processor uses the most appropriate transfer function for that appearance-affecting condition to generate a color shift vector. The color shift vector is then applied to the initial wet test patch appearance to predict the settled color of the test patch under the determined environmental condition, as indicated in block 64 of FIG. 5. The result of applying the color shift vector to the initial wet test patch appearance is a predicted settled test patch color.

As indicated in block 65 of FIG. 5, the predicted settled test patch color is compared by the processor to the desired test patch color. Differences between the two colors are then used to calculate an appropriate correction function as indicated in block 66 of FIG. 5. The correction function is based on the differences between the predicted settled test patch color and the desired test patch color, and corresponds to adjustments to the input color values for the print engine. The correction function may adjust the input color values for each of the colorants independently of the adjustment of the input color values for the other colorants. The correction function may also incorporate changes in color response due to differences in print media, colorant materials, or interaction between colorants.

As indicated in block 67 of FIG. 5, the correction function is applied to the output of the imaging system, typically by application of correction factors to the color map used by the imaging system. The color map then provides the print engine with corrected input color values in order to yield printed colors that will settle into colors that more closely approximate the initially desired output colors, under the determined appearance-affecting condition.

It should be appreciated that the number of test patches printed by the imaging system for initial measurement are not critical to the nature of the invention, and a skilled artisan is well able to determine the minimum number of test patches required in order to effectively calibrate a given printer, optionally including optically scanning the blank print medium (typically white paper). A single test patch may be sufficient for the invention. Alternatively, two test patches are printed. Preferably, at least one test patch is printed using every primary colorant used by the imaging system. Typically 2 to 8 test patches are printed for each colorant.

In one aspect of the invention, the predicted settled test patch color is exported to an external image processor, such as a raster image processor, rather than being compared to the desired test patch color by the printer processor.

The instant calibration method is useful for a variety of imaging systems, independent of the mechanism used for the application of colorant or ink. For example, the instant method is applicable to, without limitation, inkjet printers, electrophotographic printers (including xerographic printers), and offset printers. Typically, the instant calibration method is utilized by a multi-color inkjet printer. Similarly, the selection of particular sensors, scanners, inks and dyes, or environmental conditions of interest are a matter of choice for the skilled artisan. Accordingly, the present invention is intended to embrace all such alternatives, modifications and variances which fall within the scope of the appended claims.

We Claim:

1. A method of calibrating an imaging system, the method comprising:
   printing a test patch having a desired test patch appearance;
   scanning the test patch to identify an initial test patch appearance;
   determining an appearance-affecting condition;
   predicting a settled test patch appearance based on the determined appearance-affecting condition and the initial test patch appearance;
   comparing the predicted settled test patch appearance with the desired test patch appearance to yield a correction factor; and
   calibrating the imaging system to apply the correction factor to a subsequent printing operation.

2. The method of claim 1, wherein the appearance-affecting condition is an environmental condition.

3. The method of claim 2, wherein the environmental condition is determined using a sensor incorporated in the imaging system.

4. The method of claim 2, wherein the environmental condition is ambient humidity.

5. The method of claim 4, which further comprises determining ambient temperature; and wherein the step of predicting a settled test patch appearance is based on ambient temperature and ambient humidity.

6. The method of claim 2, wherein the environmental condition is ambient temperature.

7. The method of claim 1, wherein the appearance-affecting condition is lamination.

8. The method of claim 2, which further comprises selecting a print medium type, wherein the step of predicting a settled test patch appearance is based on the environmental condition and the print medium type.

9. A method of predicting ultimate appearance of an image produced by an imaging system, the method comprising:
   printing a plurality of test patches;
   optically scanning the test patches to determine an initial color for each test patch;
   permitting the test patches to individually settle under an appearance-affecting condition for a predetermined time;
   optically scanning the test patches to determine a final color for each test patch;
   calculating a shift vector for each test patch from the initial color to the final color that is a function of the appearance-affecting condition;
   applying the appropriate shift vector for a field appearance-affecting condition to a field test patch to yield a predicted field test patch color.

10. The method of claim 9, wherein the test patches are permitted to settle for 1 to 96 hours.

11. The method of claim 9, wherein the test patches are permitted to settle under a variable environmental condition.

12. The method of claim 11, wherein the environmental condition is humidity.

13. The method of claim 11, wherein the imaging system is a multi-color imaging system utilizing primary colors, and at least one test patch is printed using each primary color.

14. The method of claim 9, wherein the shift vector is a vector in CIE L*a*b* color space.

15. The method of claim 9, wherein the shift vector is a vector in CMYK color space.

16. A multi-color imaging system, comprising:
   a print engine configured to apply colorant to a print medium based on input color values corresponding to a desired color;
   an input configured to identify an appearance-affecting condition;
   a data storage device including a plurality of color shift vectors selected to predict color settling under various appearance-affecting conditions; and
   a processor linked to the data storage device and the input, the processor being configured to apply an appropriate color shift vector to an initial color to predict a settled color under the selected appearance-affecting condition.

17. The multi-color imaging system of claim 16, wherein the input is a sensor input defining an environmental condition.

18. The multi-color imaging system of claim 16, which further comprises an optical scanner linked to the processor and oriented to scan the print medium to determine the initial color.

19. The multi-color imaging system of claim 16, wherein the processor is further configured to compare the predicted settled color to the desired color, and providing the print engine with subsequent input color values to yield a subsequent initial color that is predicted to settle under the appearance-affecting condition to the desired color.

20. The multi-color imaging system of claim 16, wherein the processor is further capable of exporting the predicted settled color to an external image processor.

21. The multi-color imaging system of claim 16, wherein the imaging system is an inkjet printer, an electrophotographic printer, or an offset printer.

22. An inkjet printer, comprising:
   a printer carriage for applying a plurality of colorants to a print medium;
   an optical scanner incorporated into the printer carriage, the optical scanner including a light source and a light detector, where the optical scanner is configured to scan the print medium;
   a sensor able to measure an environmental condition;
   a data storage device having stored thereon a plurality of color shift vectors that are functions of the environmental condition; and
   a processor linked to the data storage device capable of applying the appropriate color shift vector for the measured environmental condition to an initial scanned color to yield a predicted settled color for the measured environmental condition.

* * * * *

UNITED STATES PATENT AND TRADEMARK OFFICE
CERTIFICATE OF CORRECTION

PATENT NO. : 6,985,254 B2
APPLICATION NO. : 09/846104
DATED : January 10, 2006
INVENTOR(S) : William J Allen et al.

It is certified that error appears in the above-identified patent and that said Letters Patent is hereby corrected as shown below:

In column 2, line 53, delete " $\overline{\Delta E = (\Delta L^*)^2 + (\Delta a^*)^2 + (\Delta b^*)^2}$ " and insert -- $\Delta E = \sqrt{(\Delta L^*)^2 + (\Delta a^*)^2 + (\Delta b^*)^2}$ --, therefor.

Signed and Sealed this

Fourth Day of August, 2009

JOHN DOLL
*Acting Director of the United States Patent and Trademark Office*